June 19, 1962  F. ZANDMAN  3,039,298
COMPARISON SYSTEM FOR PHOTOELASTIC MEASUREMENTS
Filed Aug. 1, 1958
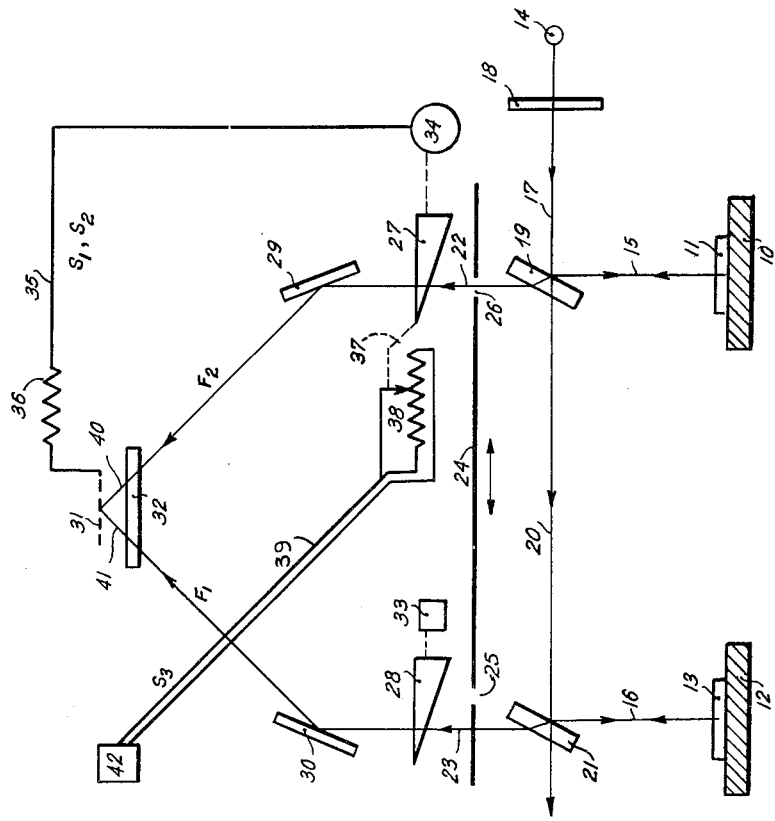
FELIX ZANDMAN
INVENTOR.
BY *Darby & Darby*
ATTORNEYS.

3,039,298
COMPARISON SYSTEM FOR PHOTOELASTIC MEASUREMENTS
Felix Zandman, Paris, France, assignor, by mesne assignments, to The Budd Company, Philadelphia, Pa., a corporation of Pennsylvania
Filed Aug. 1, 1958, Ser. No. 752,482
Claims priority, application France Sept. 17, 1957
1 Claim. (Cl. 73—88)

This invention has as its object a method of procedure and the instruments necessary for taking measurements with aid of photoelastic coatings.

These coatings became birefringent when the part to which these coatings are applied is subjected to stress.

It is an object of this invention to provide an improvement which will take measurements which are not affected by fluctuations of different parts of the instrument and the fluctuations of the environment in which the measurements are made.

In particular, it is an object of this invention to provide an instrument which is not affected by variations of the source of light used by the instrument or of external light.

It is also an object of this invention to provide an instrument which will give measurements which are not affected by eventual changes in the characteristics in the photoelastic coatings caused by time, humidity, temperature and other external effects.

It is also an object of the invention to provide an instrument and procedure which will, with the aid of the photoelastic coatings, take measurements with the null principle.

It is also an object of the invention to provide an instrument which allows measurements to be made of a physical quantity by measuring a variation of electrical current.

This invention is characterized by the fact that I am using two photoelastic coatings: one bonded to a member which is to measure the physical quantity to be determined, and the other bonded to a second, or dummy, member which will be submitted to birefringence variations due to the same external parameters as the first. Hence, the first member will record the physical quantity to be measured plus external parameter variations, and the second member will record only the external parameter variations.

These two quantities as obtained from the two photoelastic members are compared: one quantity subtracted from the other, and then the instrument will show only the physical quantity looked for. The second member operates as a compensating strain gauge. The first member performs the function of an active strain gauge.

By means of compensators, both values obtained from these two gauges are maintained in balance. The measurement then is made by means of the compensators.

This invention also has as an object the use of a photoelectric cell which is subjected alternately to two beams of light coming from these two photoelastic strain gauges. This alternate subjection of the photo-cell by the two beams of light can be done by vibrating a diaphragm, by vibrating a mirror, etc.

In the description which follows, as an example, reference is made to the drawing which is annexed hereto and which shows a schematic diagram of an instrument according to this invention.

This instrument comprises a member 10 which is subjected to a stress which depends on the physical quantity to be measured. To this member is bonded a photoelastic coating 11. To member 12 made of the same material as the member 10, but not subjected to the physical quantity to be measured, is also bonded a photoelastic coating 13, identical or similar to the coating 11. The two coatings are subjected to two beams of light coming from the same source of light 14. The two beams of light are 15 and 16, and they emanate from the single beam of light 17 issuing from the bulb 14. The incident light is polarized by a polarizer 18. The first part of the beam of light is reflected on a half-mirror 19, the second, after traversing this half-mirror 19, is reflected on a second half-mirror 21. The two beams of light after having traversed the coatings 11 and 13, and after reflection on members 10 and 12, return and traverse the half-mirrors 19 and 21, respectively. A diaphragm system 24 having two diaphragms (small openings) 25 and 26 is vibrating in such manner that when the beam 22 goes through the opening 26, the beam 23 is stopped, and, vice versa, when the beam 23 goes through the opening 25, the beam 22 is stopped. The beams 22 and 23 traverse two wedges 27 and 28 of birefringent material (optical compensators), for example, made of quartz, then are reflected on mirrors 29 and 30 and projected on the photo-cell 31, after having passed through an analyzer 32 (the analyzer is a polarizing material exactly the same as the polarizer 18).

Here, as in photoelastimetry generally, measurements depend upon comparison of intensities of elliptically polarized light. Ellipticity of reflected or refracted light depends to a degree upon the angles of incidence or refraction, and errors are introduced into any comparison of beams of polarized light unless the beams have undergone exactly the same optical diversions. Therefore, according to this invention, the comparison system comprises similar subsystems for direction of the light beam portions 40 and 41. The angles of incidence between the several reflectors of each subsystem set of reflectors and the light beam directed thereby are the same and occur in the same order for both light beam portions between polarizer 18 and analyzer 32.

Means are provided which are schematically represented by 33 for displacing by hand or for initial adjustment of the wedge 28. The wedge 27 can be displaced by servo motor system 34 which receives input signals from the photo-electric cell 31. Numerals 35 and 36 represent an electronic circuit which connects the photocell with the servo motor system. The wedge 27 is connected by a mechanism 37 with a potentiometer 38. The cable 39 joins the potentiometer with a meter 42 instrument which will measure the potentiometer electrical signal.

The operation of the instrument is as follows:

The parts 10 and 12, being free of stress, it is initially necesary to adjust the compensator 28, so as to have the same light flux $F_1$ and $F_2$ coming from the two beams of light which are collected by the photo-cell 31.

When the physical quantities to be measured are varying, the stress to which part 10 is subjected and consequently the strain to which the photoelastic coating 11 is subjected will vary. The photo-cell will then receive, sequentially, differing light flux inputs and will generate corresponding electric signal values, $S_1$ and $S_2$, each related respectively to simultaneous values of $F_1$ and $F_2$ for the compensating gauge 13 and for the active gauge 11. The difference between successive signal values, amplified or not, is utilized to control the output of servo motor system 34 which will then displace the compensator 27, so as to bring this compensator into a position which will give the same light flux and hence photoelectric signal due to the beam of light 40 as before straining of the part 10. The displacement of this wedge 27 varies the resistance factor of the potentiometer 38 which is mechanically connected to the wedge 27, thereby giving the physical quantity to be measured in the form of variation in a third electrical signal $S_3$ fed to meter 42.

External factors, such as temperature variations, external lighting variations, etc., will disturb equally both the active gauge 11 and the dummy gauge 13. If in the beginning we had signal values $S'_1$ and $S'_2$, after intervention of external parameters, we will have $S'_1+x$ and $S'_2+x$, $x$ representing the effect of the external factor which affects both members 10 and 12. These two new signal values are equal because the external variations affect equally the dummy gauge 13 and the active gauge 11, hence the output of servo motor system 34 will not change, and also the compensator 27 will not be moved. The meter 42 will give the same reading (or zero value) as if these two gauges were not subjected to any external parameters. Meter 42 will record only the variations of strain to which the active gauge is subjected, hence it will give the physical quantity to be measured not affected by external parameters. By external parameters, for example, can be mentioned the variations of the temperature, humidity, external light conditions, power supply for the bulb 14, power supply for the photo-cell, sensitivity of the photo-cell, the sensitivity to strain of the two photoelastic coatings, aging of the coatings, etc.

The instrument can be used also with circular polarizers by inserting two quarter-wave plates, one in front of the polarizer and the other in front of the analyzer.

Inasmuch as the present invention may be variously embodied, it is to be understood that this specification is exemplary of a preferred embodiment and the protection to be afforded the invention is to be interpreted in accordance with the appended claim.

What is claimed is:

A photoelastimetric system for differential measurements of elastic effects at the surface of an externally loaded workpiece, said system comprising means generating a beam of light, an analyzer, a shutter means, a light flux detector, and first and second similar subsystems; each subsystem including a workpiece surface, a photoelastic stratum attached to that surface, a variable photoelastic compensator, and reflecting means directing a subsystem portion of said beam through said stratum twice and thereafter through said compensator and through said analyzer to said detector, the angles of incidence between the reflecting means and the subsystem beam portion directed thereby being the same and occurring in the same order in both subsystems; said reflecting means including a first half mirror separating said beam into a first component beam transmitted therethrough and a second component beam rotated upon reflection thereby through a predetermined angle, and a second half mirror rotating said first component beam upon reflection thereby through said predetermined angle; said shutter means being interposed in the paths of both subsystem beam portions and alternatively interrupting transmission of one and then the other of said subsystem beam portions; said detector including means setting up an intensity comparison between successively transmitted beam portions, means responsive to any difference in the comparison varying one of said compensators in a direction to reduce such difference, and means generating an output signal proportional to compensator variations; whereby the output signal is an indication of the elastic effects and is independent of the ambient conditions.

References Cited in the file of this patent

UNITED STATES PATENTS

| | | |
|---|---|---|
| 2,014,688 | Mabboux | Sept. 17, 1935 |
| 2,341,422 | Bubb | Feb. 8, 1944 |
| 2,625,850 | Stanton | Jan. 20, 1953 |

FOREIGN PATENTS

| | | |
|---|---|---|
| 894,581 | France | Mar. 20, 1944 |
| 1,029,594 | Germany | May 8, 1958 |